(12) United States Patent
Kumar et al.

(10) Patent No.: US 12,550,031 B2
(45) Date of Patent: Feb. 10, 2026

(54) NR CELL PRIORITIZATION BASED ON CARRIER BANDWIDTH

(71) Applicant: Apple Inc., Cupertino, CA (US)

(72) Inventors: Vijayant Kumar, Munich (DE); Prasad P. Ashtekar, Haar (DE); Munish Jindal, Munich (DE)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 18/369,959

(22) Filed: Sep. 19, 2023

(65) Prior Publication Data

US 2024/0114418 A1    Apr. 4, 2024

Related U.S. Application Data

(60) Provisional application No. 63/409,566, filed on Sep. 23, 2022.

(51) Int. Cl.
*H04W 36/30*      (2009.01)
*H04W 36/00*      (2009.01)

(52) U.S. Cl.
CPC ..... *H04W 36/302* (2023.05); *H04W 36/0072* (2013.01)

(58) Field of Classification Search
CPC ........... H04W 36/302; H04W 36/0072; H04W 36/30; H04W 48/16; H04W 48/20; H04W 36/0085; H04B 17/318; H04B 17/382
See application file for complete search history.

(56) References Cited

U.S. PATENT DOCUMENTS

2013/0136021 A1   5/2013   Pankaj et al.
2016/0269919 A1*   9/2016   Kazmi .............. H04W 36/0094
(Continued)

FOREIGN PATENT DOCUMENTS

WO   WO 2021/162507 A1   8/2012
WO   WO 2021/204212 A1   10/2021

OTHER PUBLICATIONS

International Search Report and Written Opinion of the International Searching Authority directed to related International Patent Application No. PCT/US2023/074764, mailed Jan. 2, 2024; 13 pages.

(Continued)

*Primary Examiner* — Tejis Daya
(74) *Attorney, Agent, or Firm* — Sterne, Kessler, Goldstein & Fox P.L.L.C.

(57) ABSTRACT

Disclosed herein are system, method, and computer program product embodiments for NR cell prioritization based on carrier bandwidths. An embodiment operates by storing a plurality of neighboring cell frequencies and respective carrier bandwidths of the plurality of neighboring cell frequencies. The embodiment determines whether a carrier bandwidth corresponding to a neighboring cell frequency of the plurality of neighboring cell frequencies is less than a serving cell carrier bandwidth. In response to a determination that the carrier bandwidth corresponding to the neighboring cell frequency is less than the serving cell carrier bandwidth, the embodiment determines a biased signal strength measurement by adding an offset to a signal strength measurement corresponding to the neighboring cell frequency, where the offset is determined based at least in part on a data throughput requirement of the UE. The embodiment evaluates a signal strength criteria of the neighboring cell frequency using the biased signal strength measurement corresponding to the neighboring cell frequency.

20 Claims, 7 Drawing Sheets

(56) References Cited

U.S. PATENT DOCUMENTS

2019/0327655 A1\* 10/2019 Lee .................. H04W 36/0058
2020/0322863 A1\* 10/2020 Wang ................ H04W 36/0079

OTHER PUBLICATIONS

3rd Generation Partnership Project; Technical Specification Group Radio Access Network;NR; User Equipment (UE) procedures in Idle mode and RRC Inactive state; 3GPP TS 38.304; V. 15.8.0; Sep. 2021; 30 pages.

3rd Generation Partnership Project; Technical Specification Group Radio Access Network; NR; Radio Resource Control (RRC) protocol specification; 3GPP TS 38.331; V. 15.6.0; Jun. 2019; 519 pages.

\* cited by examiner

NR CELL PRIORITIZATION BASED ON CARRIER BANDWIDTH

CROSS REFERENCES

This application claims the benefit of U.S. Provisional Application No. 63/409,566 filed Sep. 23, 2022, titled "NR CELL PRIORITIZATION BASED ON CARRIER BANDWIDTH," the content of which is herein incorporated by reference in its entirety.

BACKGROUND

Field

The described aspects generally relate to mechanisms for user equipment (UE) mobility procedures in a wireless communication system.

Related Art

The 5G New Radio (NR) supports a wide range of use cases and applications that operate over various bandwidths. Also, a diverse set of UEs with different throughput capabilities support 5G. A UE primarily uses signal strength measurements of the serving cell and the neighboring cells to perform mobility procedures, such as cell selection, reselection, and handover.

SUMMARY

Some aspects of this disclosure relate to apparatuses and methods for NR cell prioritization based on carrier bandwidth. For example, some aspects of this disclosure relate to apparatuses and methods for performing cell selection, reselection, and handoff using a list of NR frequencies and bandwidths stored in a stored list database.

Some aspects of this disclosure relate to an apparatus having a memory and a processor coupled to the memory. The processor is configured to store a plurality of neighboring cell frequencies and respective carrier bandwidths of the plurality of neighboring cell frequencies. The processor is further configured to determine whether a carrier bandwidth corresponding to a neighboring cell frequency of the plurality of neighboring cell frequencies is less than a serving cell carrier bandwidth. In response to a determination that the carrier bandwidth corresponding to the neighboring cell frequency is less than the serving cell carrier bandwidth, the processor is further configured to determine a biased signal strength measurement by adding an offset to a signal strength measurement corresponding to the neighboring cell frequency, wherein the offset is determined based at least in part on a data throughput requirement of a UE, and evaluate a signal strength criteria of the neighboring cell frequency using the biased signal strength measurement corresponding to the neighboring cell frequency.

According to some aspects, in response to a determination that the carrier bandwidth corresponding to a second neighboring cell frequency is greater than the serving cell carrier bandwidth, the processor can be further configured to determine a second biased signal strength measurement by adding a second offset to the signal strength measurement corresponding to the second neighboring cell frequency, where the second offset is determined based at least in part on the data throughput requirement of the UE. The processor is further configured to evaluate the signal strength criteria of the second neighboring cell frequency using the second biased signal strength measurement corresponding to the second neighboring cell frequency.

According to some aspects, when the UE has a low data throughput requirement and the carrier bandwidth corresponding to the neighboring cell frequency is less than the serving cell carrier bandwidth, the offset is configured to be a positive value. According to some aspects, when the UE has a high data throughput requirement, and the carrier bandwidth corresponding to the neighboring cell frequency is less than the serving cell carrier bandwidth, the offset is configured to be a negative value.

According to some aspects, when the UE has a low data throughput requirement and the carrier bandwidth corresponding to the neighboring cell frequency is greater than the serving cell carrier bandwidth, the offset is configured to be a negative value. According to some aspects, the UE has a high data throughput requirement and the carrier bandwidth corresponding to the neighboring cell frequency is greater than the serving cell carrier bandwidth, the offset is configured to be a positive value.

According to some aspects, the signal strength criteria is a cell reselection criteria of the neighboring cell frequency. According to some aspects, the signal strength criteria is an A3, A4, or A5 criteria. According to some aspects, the offset is determined based, at least in part, on a difference between the carrier bandwidth corresponding to the neighboring cell and the serving cell carrier bandwidth.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
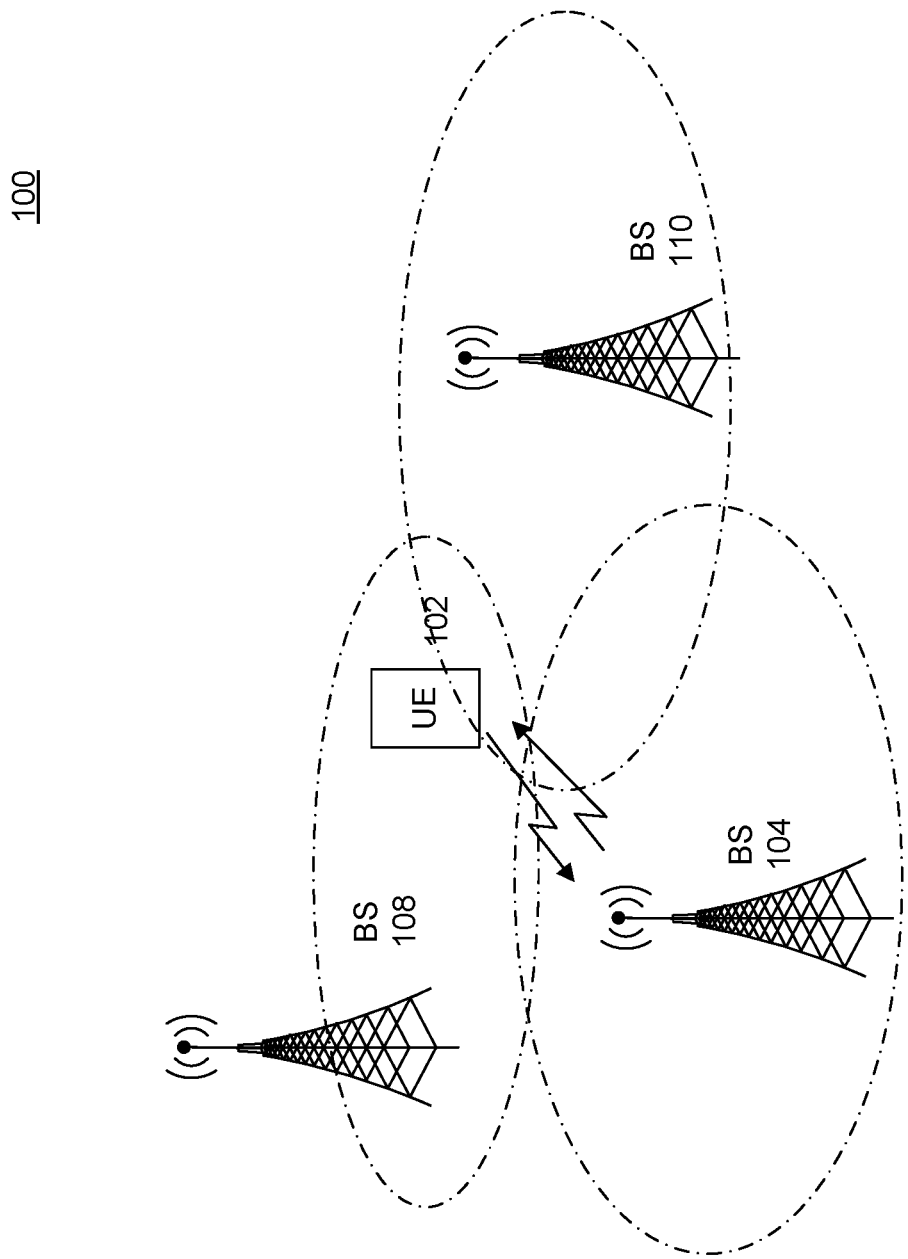
FIG. 1 illustrates an example wireless system implementing prioritized NR cell prioritization based on carrier bandwidth, according to some aspects of the disclosure

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Use case scenarios for 5G NR include enhanced mobile broadband (eMBB), ultra-reliable low-latency communications (URLLC), and massive machine type communications (mMTC). These use cases cover a wide range of applications with highly diverse requirements. As a result, a diverse set of UEs with different throughput capabilities support 5G. To accommodate the resulting diverse spectrum scenarios, 5G NR supports channel bandwidths from 5 MHz to 200 MHz for the frequency range 1 (FR1) and up to 400 MHz for the frequency range 2 (FR2). Also, the Narrowband Internet of Things (NB-IoT) implementations that support mMTC services use a narrowband carrier (e.g., 180 kHz).

When a UE camps on a cell with a carrier bandwidth that is smaller than the bandwidth supported by the UE, it cannot operate at its full throughput capacity. Consequently, the UE may have to handoff to a cell with higher bandwidth. Also, when a UE with a small throughput requirement (e.g., an IoT device) camps on a cell with a larger carrier bandwidth, the UE's power performance or battery life might be adversely impacted.

To address the above technological issues, embodiments herein provide cell search, reselection, and handover procedures that take into account the carrier bandwidths of the available cells and the throughput requirement of the UE. Some aspects of this disclosure relate to apparatuses and methods for implementing mechanisms for NR cell prioritization based on carrier bandwidth. For example, some aspects of this disclosure relate to apparatus and methods for implementing stored information cell search based on carrier bandwidth. Additionally, some aspects of this disclosure relate to apparatus and methods for implementing cell reselection and handoff based on carrier bandwidth.

FIG. 1 illustrates an example wireless system 100 implementing prioritized NR cell prioritization based on carrier bandwidth, according to some aspects of the disclosure. The example wireless system 100 is provided for the purpose of illustration only and does not limit the disclosed aspects. Wireless system 100 may include, but is not limited to, a base station 104, a base station 106, a base station 108, and a user equipment (UE) 102.

According to some aspects, base station 104, base station 106, and base station 108 can be a fixed station or a mobile station. Base station 104, base station 106, and base station 108 may be referred to as a cellular IoT base station, an evolved NodeB (eNB), a next generation node B (gNB), a 5G node B (NB), or some other equivalent terminology. In some examples, base station 104, base station 106, and base station 108 can be interconnected to one another and/or to other base stations or network nodes in a network through various types of backhaul interfaces such as a direct physical connection, a virtual network, and/or the like, not shown.

According to some aspects, UE 102 can be configured to operate based on a wide variety of wireless communication techniques. These techniques can include, but are not limited to, techniques based on 3rd Generation Partnership Project (3GPP) standards. UE 102 can be stationary or mobile. UE 102 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 102 may be capable of communicating with one or more base stations of the wireless system 100. According to some aspects, wireless system 100 may utilize one or more radio access technologies (RATs) and may have overlapping coverage from one or more RATs.

According to some aspects, base stations 104, 106, and 108 are NR base stations. An NR radio access network (RAN) includes NR base stations and a new radio core network (CN). An NR base station can be a next generation node B (gNode B). UE 102 can access an external network via an NR base station and the NR CN.

According to some aspects, base station 104, base station 106, and base station 108 may have overlapping coverage areas. A base station may provide one or more cells. For example, a first base station may provide a serving cell to UE 102, and a second base station may provide a neighboring cell. According to some aspects, a single base station may provide both a serving cell and one or more neighboring cells. According to some aspects, base station 104, base station 110, base station 106, and base station 108 may be managed by the same public land mobile network (PLMN).

According to some aspects, base stations 104, 106, and 108 periodically broadcast a series of system information at regular intervals. Base stations 104, 106, and 108 can broadcast system information in system information blocks (SIBs) (e.g., system information block 1 (SIB 1), SIB 2, SIB 4). SIBs broadcasted by the base stations comprise information related to serving cell frequencies and inter-frequency neighboring cells relevant for cell reselection. SIBs also include cell reselection parameters common for a frequency and cell-specific reselection parameters. SIB 1 includes information corresponding to the carrier bandwidth of the broadcasting base station.

According to some aspects, UE 102 stores the system information it receives from NR base stations it has camped on in a stored list database 256. The stored list database includes a list of carrier frequencies on which the UE has previously camped on, and carrier bandwidth information corresponding to each carrier frequency in the list. The stored list database also includes information on cell selection, reselection, and handover parameters from previously received measurement control information elements. According to some aspects, UE 102 may store its stored list database 256 in a local memory (e.g., in memory 250 of FIG. 2 of UE 102). According to some aspects, stored list database of UE 102 may be stored at a remote location (e.g., a remote server).

According to some aspects, UE 102 performs signal strength measurements of the serving cell and the neighboring cells to perform mobility procedures, such as cell selection, reselection, and handover. UE 102 performs signal strength measurements of cells in one or more NR frequencies to find a cell whose signal strength meets certain criteria. Cell selection, reselection, and handover criteria can be evaluated based on one or more signal strength metrics or signal quality metrics obtained by UE 102. According to some aspects, signal strength metrics include received signal strength indicator (RSSI), received signal code power (RSCP), and reference signal received power (RSRP). According to some aspects, signal quality metrics include signal to interference plus noise ratio (SINR) and reference signal received quality (RSCP).

Figure 2:
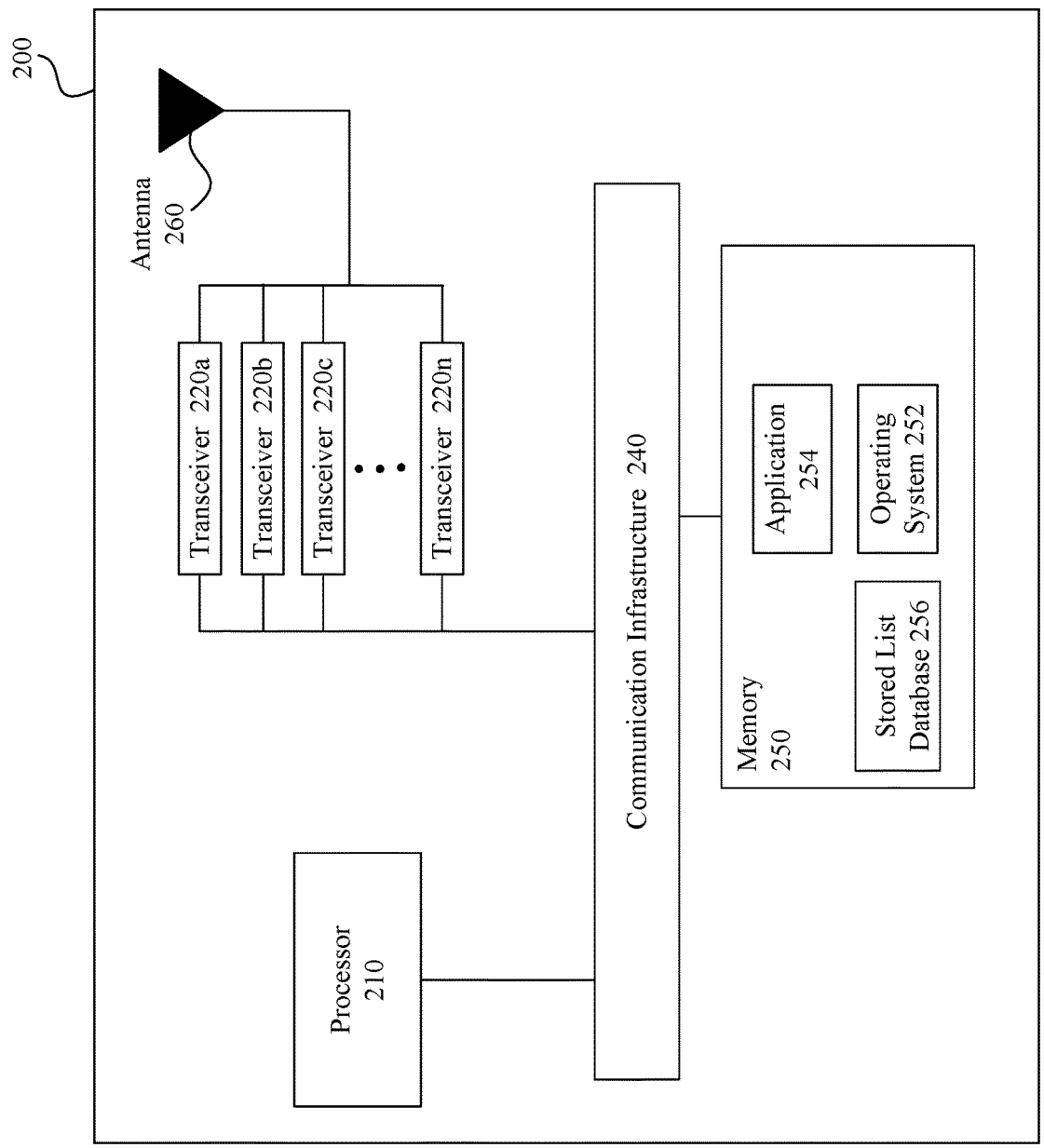
FIG. 2 illustrates a block diagram of an example system of an electronic device implementing NR cell prioritization based on carrier bandwidth, according to some aspects of the disclosure.

FIG. 2 illustrates a block diagram of an example system 200 of an electronic device implementing NR cell prioritization based on carrier bandwidth, according to some aspects of the disclosure. System 200 may be any of the base stations 101 or 107, and/or UE 103 of system 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer. Memory 250 may include a stored list database 256. According to some aspects, stored list database 256 facilitates storing list of carrier frequencies which the UE has previously camped on and corresponding carrier bandwidth information for executing NR cell prioritization based on carrier bandwidth as described herein.

According to some examples, application 254 can be stored in memory 250.

Application 254 can include applications (e.g., user applications) used by wireless system 200 and/or a user of wireless system 200. The applications in application 254 can include applications such as, but not limited to, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with computer instructions stored in memory 250 performs operations enabling system 200 of system 100 to implement NR cell prioritization based on carrier bandwidth, according to some aspects of the disclosure, as described herein. Alternatively, processor 210 can be "hard-coded" to implement NR cell prioritization based on carrier bandwidth, as described herein.

One or more transceivers 220a-220n transmit and receive communications signals that support getting UE 102 into service on a NR cell based on carrier bandwidth, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, amplifiers, filters, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks such as 5G NR and the like. For example, one or more transceivers 220a-220n can be configured to operate according to one or more of Rel-15, Rel-16, Rel-17, or other of the 3GPP standards.

According to some aspects, processor 210, alone or in combination with computer instructions stored within memory 250, and/or one or more transceiver 220a-220n, implements cell selection procedure to get a UE into service on a prioritized RAT after out-of-service detection, as discussed herein. Alternatively, processor 210 can be "hard-coded" to implement NR cell prioritization based on carrier bandwidth, as described herein.

Figure 3:
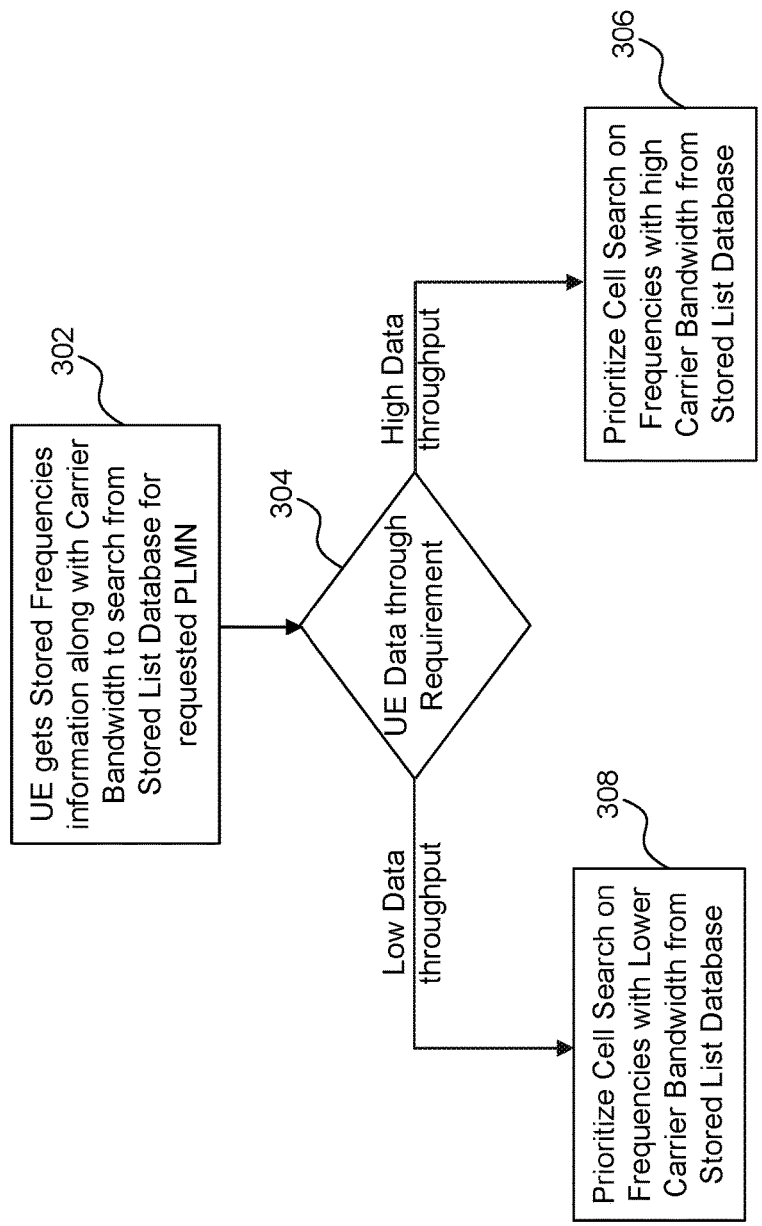
FIG. 3 illustrates exemplary operations performed by a UE implementing prioritized cell search based on carrier bandwidth, according to some aspects of this disclosure.

FIG. 3 illustrates exemplary operations performed by UE 102 that implements prioritized cell search based on carrier bandwidth, according to some aspects of this disclosure. Method 300 can be performed by UE 102, as shown in FIGS. 1 and 2. For example, the functions of method 300 can be performed by processor 210 or caused to be performed by processor 210 of UE 102.

At 302, UE 102 obtains a stored list of carrier frequencies and corresponding bandwidth information corresponding to a selected PLMN from its stored list database. According to some aspects, the stored list database comprises a list of carrier frequencies on which the UE has previously camped on and carrier bandwidth information corresponding to each carrier frequency in the list. The stored list database also includes information on cell selection parameters from previously received measurement control information elements.

According to some aspects, once UE 102 is powered up, it performs a public land mobile network (PLMN) selection procedure. After selecting a PLMN, UE 102 implements a stored information cell selection to find a suitable cell to camp on in the selected PLMN. During the stored information cell selection procedure, UE 102 performs a search over the stored list of carrier frequencies corresponding to the selected PLMN from the stored list database.

At 304, a determination is made as to whether UE 102 has a high throughput requirement or a low throughput requirement. According to some aspects, the throughput requirement of a UE is determined based on a downlink or uplink category of the UE. Also, at 304, each carrier frequency of the stored list of frequencies is classified based on its bandwidth as a high-bandwidth carrier or a low-bandwidth carrier. According to some aspects, each carrier frequency is classified relative to a maximum bandwidth that can be supported by UE 102 when using the carrier frequency. According to some aspects, each carrier frequency is classified as a high bandwidth carrier or low bandwidth carrier relative to a bandwidth threshold, where the bandwidth threshold is based on a category of UE 102.

At 306, based on a determination that UE 102 has high throughput requirement, UE 102 performs a prioritized cell search on carrier frequencies from the stored list database that are classified as high-bandwidth carriers. According to some aspects, for prioritized cell search, the list of frequencies in the stored list database are sorted based on their respective bandwidths. According to some aspects, the order in which the carrier frequencies are searched is based on whether UE 102 has a high throughput requirement or a low throughput requirement. When UE 102 has a high throughput requirement, the list of frequencies is searched in a descending order of their respective bandwidths. In other words, the highest frequency is searched first and the lowest frequency is searched last in a decending fashion. Alternatively, when UE 102 has a low throughput requirement, the list of frequencies is searched in ascending order of their bandwidths, so the lowest frequency is searched first and the highest frequency is searched last in an ascending order.

According to some aspects, UE 102 performs a stored information cell search using the stored list database (e.g., 256 in memory 250) to find a suitable cell having a high-bandwidth carrier. According to some aspects, a suitable cell is not part of a tracking area that is in a list of forbidden tracking areas for roaming, and does not have a barred status. A suitable cell also fulfills a cell selection criteria (e.g., S criteria specified in 3GPP TS 38.304). According to some aspects, a high-bandwidth carrier frequency satisfies the cell selection criteria when the following conditions are met: Srxlev>0 and Squal>0, where Srxlev is a signal receive-level value and Squal is a signal quality value corresponding to the measured carrier frequency. According to some aspects, Srxlev is determined based on a measured frequency receive-level value and a minimum required receive-level in the cell. Once a UE, that has a high throughput requirement, finds a suitable cell with a high-bandwidth carrier, it selects the cell and camps on it.

According to some aspects, when UE 102 has a high throughput requirement and does not find a suitable cell on any of the high-bandwidth carriers in the list of frequencies, UE 102 may attempt to find a suitable cell by searching over the low-bandwidth carriers in the stored list of frequencies. When UE 102 has a high throughput requirement and performs a cell search over low-bandwidth carriers, the frequency list may be searched in descending order of the carrier bandwidths.

At 308, based on a determination that UE 102 has a low throughput requirement, UE 102 performs a prioritized cell search on carrier frequencies from the stored list database that are classified as low-bandwidth carriers. When UE 102 has a low throughput requirement, the list of frequencies in the stored list database are searched in ascending order of their bandwidths.

According to some aspects, UE 102 performs a stored information cell search using the stored list database to find a suitable cell having a low-bandwidth carrier. According to some aspects, a low-bandwidth carrier frequency satisfies the cell selection criteria when the following conditions are met: Srxlev>0 and Squal>0, where Srxlev is a signal receive-level value and Squal is a signal quality value corresponding to the measured carrier frequency. Once a UE that has a low throughput requirement, finds a suitable cell with a low-bandwidth carrier, it selects the cell and camps on it.

According to some aspects, when UE 102 has a low throughput requirement and does not find a suitable cell on any of the low-bandwidth carriers in the list of frequencies, UE 102 may attempt to find a suitable cell by searching over the high-bandwidth carriers in the stored list of frequencies. When UE 102 has a low throughput requirement and performs a cell search over high-bandwidth carriers, the frequency list may be sorted in ascending order of the bandwidths.

Figure 4:
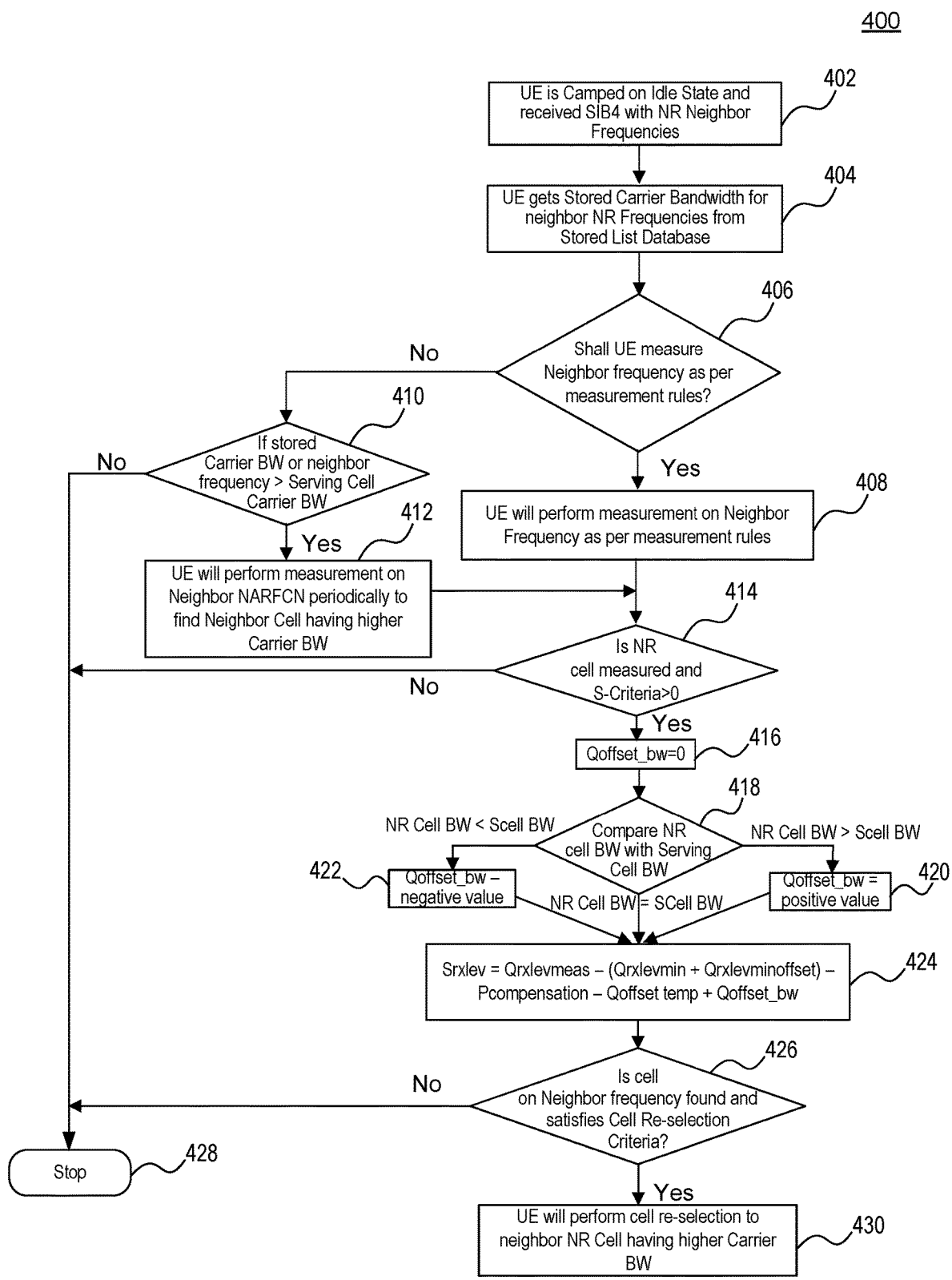
FIG. 4 illustrates exemplary operations performed by a UE implementing prioritized cell reselection based on carrier bandwidth, according to some aspects of this disclosure.

FIG. 4 illustrates exemplary operations performed by UE 102 that implements prioritized cell reselection based on carrier bandwidth, according to some aspects of this disclosure. Method 400 can be performed by UE 102 as shown in FIGS. 1 and 2. For example, the functions of method 400 can performed by processor 210 or caused to be performed by processor 210 of UE 102.

At 402, UE 102 is camped on a cell of an NR base station (e.g., base stations 104, 106, or 108) in a radio resource control (RRC) idle state and receives system information block (SIB) broadcasts. For example, SIB 4 received by UE 102 from the camped-on base station comprises information regarding NR frequencies and inter-frequency neighboring cells relevant for cell reselection, including cell reselection parameters common for a frequency and cell-specific reselection parameters. The SIB 2 received by UE 102 from the base station comprises cell reselection information related to the serving cell.

At 404, UE 102 obtains carrier bandwidth values corresponding to the camped on cell's neighboring frequencies from its stored list database 256. According to some aspects, the stored list database 256 comprises a list of carrier frequencies that the UE has previously camped on and carrier bandwidth information corresponding to each carrier frequency in the list. The stored list database 256 also includes information on cell reselection parameters from previously received measurement control information elements.

At 406, for each neighboring cell frequency from the stored list database 256, UE 102 makes a determination as to whether one or more criteria to initiate measurements for cell reselection has been satisfied. According to some aspects, a determination to initiate neighboring cell measurements is made based on the strength and/or quality of the signal received from the serving cell. For example, UE 102 may skip neighboring cell measurements when the serving cell satisfies both the following conditions:

Srxlev>$S_{IntraSearchP}$ and Squal>$S_{IntraSearchQ}$, where the parameters $S_{IntraSearchP}$ and $S_{IntraSearchQ}$ are specified in a SIB2. However, UE 102 initiates intra-frequency neighboring cell measurements when either condition is not satisfied. According to some aspects, UE 102 always performs measurements for reselection towards a higher reselection priority inter-frequency neighbor.

At 408, based on a determination that one or more criteria to initiate measurements for cell reselection have been satisfied (e.g., condition Srxlev>$S_{IntraSearchP}$ and/or Squal>$S_{IntraSearchQ}$ are not satisfied), UE 102 performs measurements on neighboring cell frequencies. UE 102 measures signal receive-level value Srxlev and signal quality value Squal corresponding to each neighboring cell frequency from the stored list database.

At 410, based on a determination that none of the criteria to initiate measurements for cell reselection have been satisfied, UE 102 compares carrier bandwidths of the neighboring cell frequencies with the current cell carrier bandwidth. At 410, UE 102 makes a determination as to whether a bandwidth based cell reselection may be triggered. According to some aspects, when UE 102 has a high throughput requirement and a neighboring cell frequency that has a carrier bandwidth greater than the serving cell carrier bandwidth, UE 102 triggers measurements on the neighboring cell frequency. Alternatively, when UE 102 has a low throughput requirement and a neighboring cell frequency that has a carrier bandwidth that is lower than the serving cell carrier bandwidth but has a sufficient bandwidth to support the throughput requirement of UE 102, UE 102 triggers measurements on the neighboring cell frequency.

At 412, based on the throughput requirement of UE 102 and the carrier bandwidth of the serving cell, UE 102 performs measurements on a subset of neighboring cell frequencies. When UE 102 has a high throughput requirement and the serving cell has a low carrier bandwidth, UE 102 performs measurements on neighboring cell frequencies that have a high carrier bandwidth for consideration for cell reselection, e.g. on neighboring cell frequencies that have a higher carrier bandwidth than that of current serving cell frequency. Alternatively, when UE 102 has a low throughput requirement, and the serving cell has a high carrier bandwidth, UE 102 performs measurements on neighboring cell frequencies that have a low carrier bandwidth for consideration for cell reselection, e.g. on neighboring cell frequencies that have a lower carrier bandwidth than that current serving cell frequency.

At 414, a determination is made whether the measured neighboring cell frequencies satisfy the S-criteria. Only the neighboring cell frequencies that satisfy the S-criteria are considered for carrier bandwidth based cell selection. According to some aspects, a frequency satisfies the S-criteria criteria when the following conditions are met: Srxlev>0 and Squal>0, where Srxlev is a signal receive-level value and Squal is a signal quality value corresponding to the measured carrier frequency.

At 416, each neighboring cell frequency that satisfies the S-criteria at 414 is assigned a offset parameter $Q_{offset\_BW}$. According to some aspects, the initial value of $Q_{offset\_BW}$ may be set to a zero or a non-zero value.

At 418, the carrier bandwidth of each neighboring cell frequency is compared with the serving cell carrier bandwidth. If UE 102 has a high throughput requirement and the serving cell carrier bandwidth is low, cell reselection to a high bandwidth neighboring cell frequency is prioritized. Alternatively, if UE 102 has a low throughput requirement and the serving cell carrier bandwidth is high, cell reselection to a low bandwidth neighboring cell frequency is prioritized.

At 420, based on a determination that the carrier bandwidth of a neighboring cell frequency is greater than the serving cell carrier bandwidth and based on a determination that UE 102 has a high throughput requirement, the value of the offset parameter $Q_{offset\_BW}$ is set to a positive value. When UE 102 has a high throughput requirement, adding the offset parameter $Q_{offset\_BW}$ (i.e., setting $Q_{offset\_BW}$ to a positive value) to a signal level measurement renders the high-bandwidth neighboring cell frequency more attractive for cell reselection. According to some aspects, the value of the offset parameter $Q_{offset\_BW}$ may be determined based on a difference between the carrier bandwidth of a neighboring cell frequency and the serving cell carrier bandwidth. According to some aspects, the offset parameter $Q_{offset\_BW}$ may be provided by the network in a SIB.

Alternatively, based on a determination that the carrier bandwidth of a neighboring cell frequency is smaller than the serving cell carrier bandwidth and based on a determination that UE 102 has a very low throughput requirement, the value of the offset parameter $Q_{offset\_BW}$ is set to a positive value. When UE 102 has a very low throughput requirement, adding the offset parameter $Q_{offset\_BW}$ (i.e., setting $Q_{offset\_BW}$ to a positive value) to a signal level measurement renders the lower-bandwidth neighboring cell frequency more attractive to UE 102 for cell reselection.

At 422, based on a determination that carrier bandwidth of a neighboring cell frequency is less than the serving cell carrier bandwidth and based on a determination that UE 102 has a high throughput requirement, the value of the offset parameter $Q_{offset\_BW}$ is set to a negative value. When UE 102 has a high throughput requirement, subtracting the offset parameter $Q_{offset\_BW}$ (i.e., setting $Q_{offset\_BW}$ to a negative value) from a signal level measurement renders the lower-bandwidth neighboring cell frequency less attractive to UE 102 for cell reselection.

Alternatively, based on a determination that carrier bandwidth of a neighboring cell frequency is greater than the serving cell carrier bandwidth and based on a determination that UE 102 has a very low throughput requirement, the value of the offset parameter $Q_{offset\_BW}$ is set to a negative value. When UE 102 has a very low throughput requirement, adding the offset parameter $Q_{offset\_BW}$ (i.e., setting $Q_{offset\_BW}$ to a positive value) to a signal level measurement renders the higher-bandwidth neighboring cell frequency less attractive to UE 102 for cell reselection.

At 424, signal receive-level values corresponding to the neighboring cell frequencies that are candidates for cell reselection are calculated using the offset parameter. According to some aspects, the signal receive-level values corresponding a neighboring cell frequency is evaluated as: Srxlev=$Q_{rxlevmeas}-(Q_{rxlevmin}+Q_{rxlevminoffset})-P_{compensation}-Q_{offset\_temp}+Q_{offset\_BW}$, where $Q_{rxlevmeas}$ is the measured neighboring cell frequency receive-level value (RSRP), and the offset parameters $Q_{rxlevminoffset}$, $P_{compensation}$, and $Q_{offset\_temp}$ are obtained from SIBs (e.g., SIB1, SIB2, and SIB 4).

At 426, UE 102 ranks the signal receive-level values corresponding the all candidate neighboring cell frequencies that satisfy the cell selection criteria (e.g., the S-Criteria). According to some aspects, UE 102 identifies and selects the cell corresponding to the highest ranked frequency.

At 430, UE 102 performs cell reselection to a neighboring NR cell having a higher carrier bandwidth when it has a high throughput requirement. Alternatively, when UE 102 has a low throughput requirement, it may perform cell reselection to a neighboring NR cell having a lower carrier bandwidth.

Figure 5:
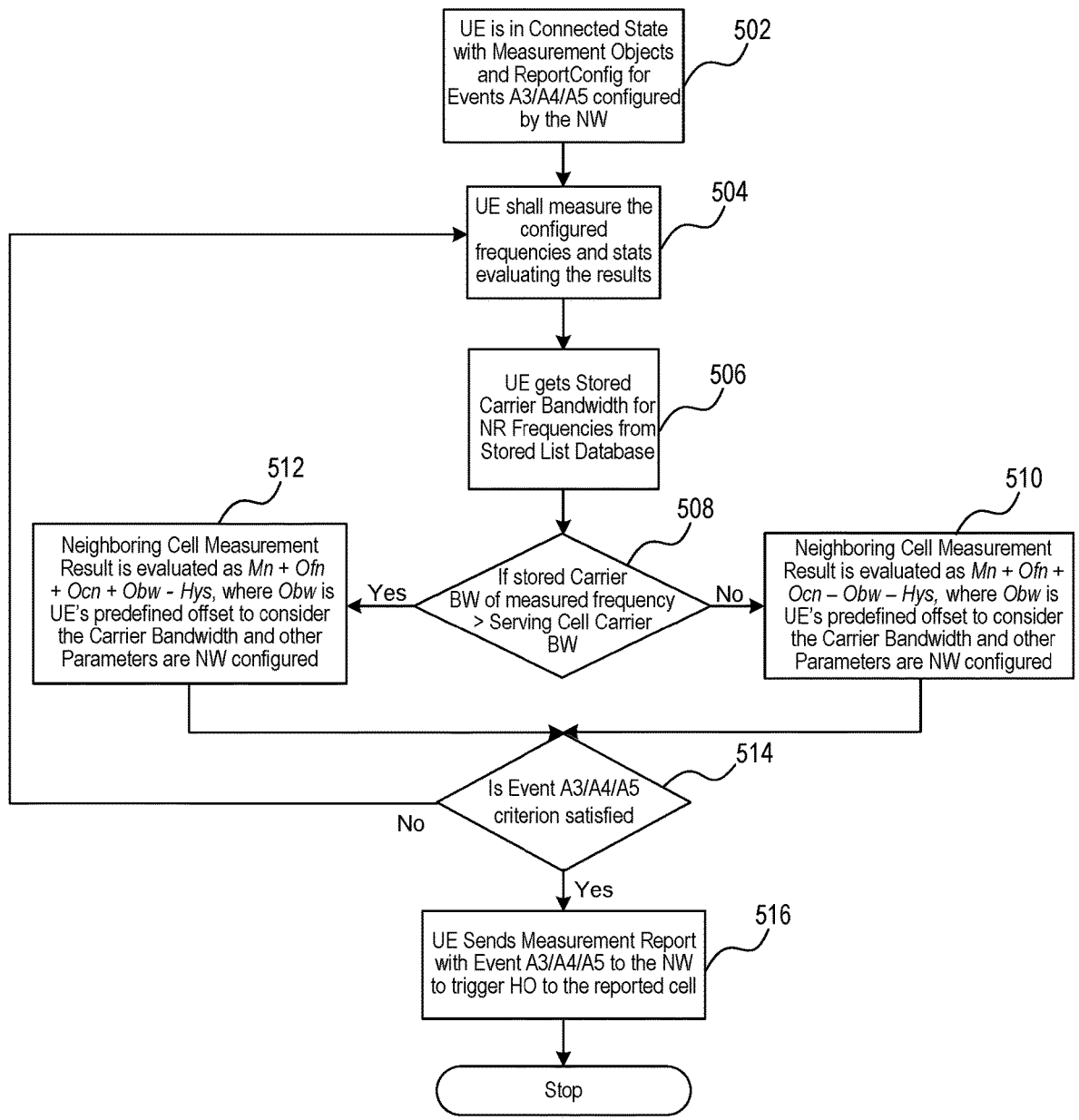
FIG. 5 illustrates exemplary operations performed by a UE implementing prioritized handover based on carrier bandwidth, according to some aspects of this disclosure.

FIG. 5 illustrates exemplary operations performed by UE 102 that implements prioritized handover based on carrier bandwidth, according to some aspects of this disclosure. Method 500 can be performed by UE 102 as shown in FIGS. 1 and 2. For example, the functions of method 500 can be performed by processor 210 or caused to be performed by processor 210 of UE 102.

At 502, UE 102 is camped on a cell of NR base station (e.g., base stations 104, 106, or 108) in RRC connected state and is configured to perform and report intra-frequency and inter-frequency cell measurements. According to some aspects, UE 102 is configured with measurement objects and reporting configurations for one or more measurement reporting events (e.g., Events A3, A4, and A5), as specified in 3GPP TS 38.331.

According to some aspects, UE 102 is configured with a measurement object that identifies the time and frequency location of the reference signal that are to be measured resources (e.g., SS/PBCH blocks and CSI reference signal). Further, the configured measurement object may specify a set of cell specific measurement offsets to make individual cells appear either more attractive or less attractive.

According to some aspects, UE 102 is further provided with a reporting configuration by the network. According to some aspects, UE 102 is provide with an event triggered configuration for NR measurement reporting. An event-triggered configuration provides parameters for various measurement events such as, for example, events A3, A4, and A5. The reporting configuration also specifies the reference signal type used to trigger an event, the number of reports which are sent after the event has triggered and the time interval between those reports.

At 504, UE 102 performs measurements on a configured list of neighboring cell frequencies. According to some aspects, UE 102 performs measurements of synchronization signal (SS) (e.g., SS-reference signal received power (SS-RSRP), SS-reference signal received quality (SS-RSRQ), or SS-signal to interference and noise ratio (SS_SINR)) measurements corresponding to the serving cell and the configured list of neighboring cell frequencies. According to some aspects, UE 102 performs measurements of channel state information (CSI) reference signal (e.g., CSI-RSRP, CSI-RSRQ, and CSI-SINR) measurements corresponding to the serving cell and the configured list of neighboring cell frequencies.

At 506, UE 102 obtains carrier bandwidth values corresponding to neighboring cell frequencies of the serving cell from the stored list database (e.g., stored list database 256 in memory 250). According to some aspects, UE 102 is configured by the network with a list of frequencies that may be measured. UE 102 uses the stored list database to determine carrier bandwidths of the frequencies that are to be measured.

At 508, the carrier bandwidth of each neighboring cell frequency is compared with the serving cell carrier bandwidth. If UE 102 has a high throughput requirement and the carrier bandwidth of the serving cell is low, handoff to a neighboring cell having a high-bandwidth carrier is prioritized. Alternatively, if UE 102 has a low throughput requirement and the carrier bandwidth of the serving cell is high, handoff to a neighboring cell having a low-bandwidth carrier is prioritized.

At 510, based on a determination that the carrier bandwidth of a neighboring cell frequency is less than the serving cell carrier bandwidth and based on a determination that UE 102 has a high throughput requirement, a bandwidth based signal strength offset $O_{bandwdth}$ is subtracted from the neighboring cell frequency measurement. According to some aspects, using the bandwidth based signal strength offset $O_{bandwdth}$, a neighboring cell frequency measurement result is evaluated as: $\text{Meas}_{neigh}+O_{neigh,freq}+O_{neigh,cell}-O_{bandwidth}-\text{Hys}$, where $\text{Meas}_{neigh}$ is the signal measurement (e.g., RSRP, RSRQ, SINR) corresponding to the neighboring cell frequency. When UE 102 has a high throughput requirement, subtracting the bandwidth based signal strength offset $O_{bandwdth}$ from the frequency measurement renders the low-bandwidth neighboring cell frequency less attractive for handover. According to some aspects, the offset parameter $O_{neigh,freq}$ is provided by the network (e.g., in a measurement object) and may be specific to a neighboring cell frequency. According to some aspects, the offset parameter $O_{neigh,cell}$ and the hysteresis parameter Hys are provided by the network (e.g., in a measurement object) and may be specific to a neighboring cell.

According to some aspects, a bandwidth based signal strength offset $O_{bandwdth}$ is determined by UE 102 based on the difference between the carrier bandwidth of the neighboring cell frequency and the carrier bandwidth of the serving cell. According to some aspects, the value of the offset $O_{bandwdth}$ may depend on the type of the measurement $\text{Meas}_{neigh}$ (e.g., RSRP, RSRQ, or SINR). According to some aspects, the offset $O_{bandwdth}$ may be configured with a value between 0 dB and 15 dB.

Alternatively, when UE 102 has a low throughput requirement, based on a determination that the carrier bandwidth of a neighboring cell frequency is less than the serving cell carrier bandwidth, a bandwidth based signal strength offset $O_{bandwdth}$ is added to the neighboring cell frequency measurement. When UE 102 has a low throughput requirement, the neighboring cell frequency measurement result is evaluated as: $\text{Meas}_{neigh}+O_{neigh,freq}+O_{neigh,cell}+O_{bandwidth}-\text{Hys}$. When UE 102 has a low throughput requirement, adding the bandwidth based signal strength offset $O_{bandwdth}$ to the frequency measurement renders the low-bandwidth neighboring cell frequency more attractive for handover.

At 512, based on a determination that the carrier bandwidth of a neighboring cell frequency is greater than the serving cell carrier bandwidth and UE 102 has a high throughput requirement, a bandwidth based signal strength offset $O_{bandwdth}$ is added to the neighboring cell frequency measurement. According to some aspects, using the bandwidth based signal strength offset $O_{bandwdth}$, the neighboring cell frequency measurement result is evaluated as: $\text{Meas}_{neigh}+O_{neigh,freq}+O_{neigh,cell}+O_{bandwidth}-\text{Hys}$. When UE 102 has a high throughput requirement, adding the bandwidth based signal strength offset $O_{bandwdth}$ to the frequency measurement renders the high-bandwidth neighboring cell frequency more attractive for handover. According to some aspects, a bandwidth based signal strength offset $O_{bandwdth}$ is determined by UE 102 based on the difference between the carrier bandwidth of the neighboring cell frequency and the carrier bandwidth of the serving cell.

Alternatively, when UE 102 has a low throughput requirement, based on a determination that carrier bandwidth of a neighboring cell frequency is greater than the serving cell carrier bandwidth, a bandwidth based signal strength offset $O_{bandwdth}$ is subtracted from the neighboring cell frequency measurement. When UE 102 has a low throughput requirement, the neighboring cell frequency measurement result is evaluated as: $\text{Meas}_{neigh}+O_{neigh,freq}+O_{neigh,cell}-O_{bandwidth}-\text{Hys}$. When UE 102 has a low throughput requirement, adding the bandwidth based signal strength offset $O_{bandwdth}$ to the frequency measurement renders the higher-bandwidth neighboring cell frequency less attractive for handover.

At 514, a determination is made whether the neighboring cell frequency measurements satisfy the criteria to trigger measurement events A3, A4, and A5.

According to some aspects, event A3 is triggered when a neighboring cell frequency measurement becomes better than a serving cell measurement by an offset. The offset can be a positive value or a negative. For example, when UE 102 has a high throughput requirement and the carrier bandwidth of a neighboring cell frequency is greater than the serving cell carrier bandwidth, the event A3 is triggered when the following condition is satisfied: $\text{Meas}_{neigh}+O_{neigh,freq}+O_{neigh,cell}-\text{Hys}>\text{Mease}_{serv}+O_{serv,freq}+O_{serv,cell}-\text{Offset}$, where $\text{Meas}_{serv}$ is the signal measurement (e.g., RSRP, RSRQ, SINR) corresponding to the serving cell, and $O_{serv,freq}$, $O_{serv,cell}$, and Offset are the parameters provided by the network.

According to some aspects, event A4 is triggered when a neighboring cell frequency measurement becomes better than a threshold. For example, when UE 102 has a high throughput requirement, and the carrier bandwidth of a neighboring cell frequency is greater than the serving cell carrier bandwidth, the event A4 is triggered when the following condition is satisfied: $\text{Meas}_{neigh}+O_{neigh,freq}+O_{neigh,cell}-\text{Hys}>\text{Threshold2}$ where the parameter Threshold is provide by the network.

According to some aspects, Event A5 is triggered when the serving cell measurement becomes worse that threshold1, while a neighboring cell frequency measurement becomes better than threshold2. For example, when UE 102 has a high throughput requirement and the carrier bandwidth of a neighboring cell frequency is greater than the serving cell carrier bandwidth, the event A5 is triggered when both of the following conditions are satisfied: $\text{Meas}_{serv}+\text{Hys}>\text{Threshold1}$ and $\text{Meas}_{neigh}+O_{neigh,freq}+O_{neigh,cell}-\text{Hys}>\text{Threshold2}$, where the parameters and Threshold1 are Threshold2 are provided by the network.

At 516, in response to one or more reporting event (events A3, A4, or A5) being triggered, UE 102 sends measurement reports with the information corresponding to the triggered events to the network. The network may then executes a handoff to the neighboring cell corresponding to the triggered events.

Figure 6:
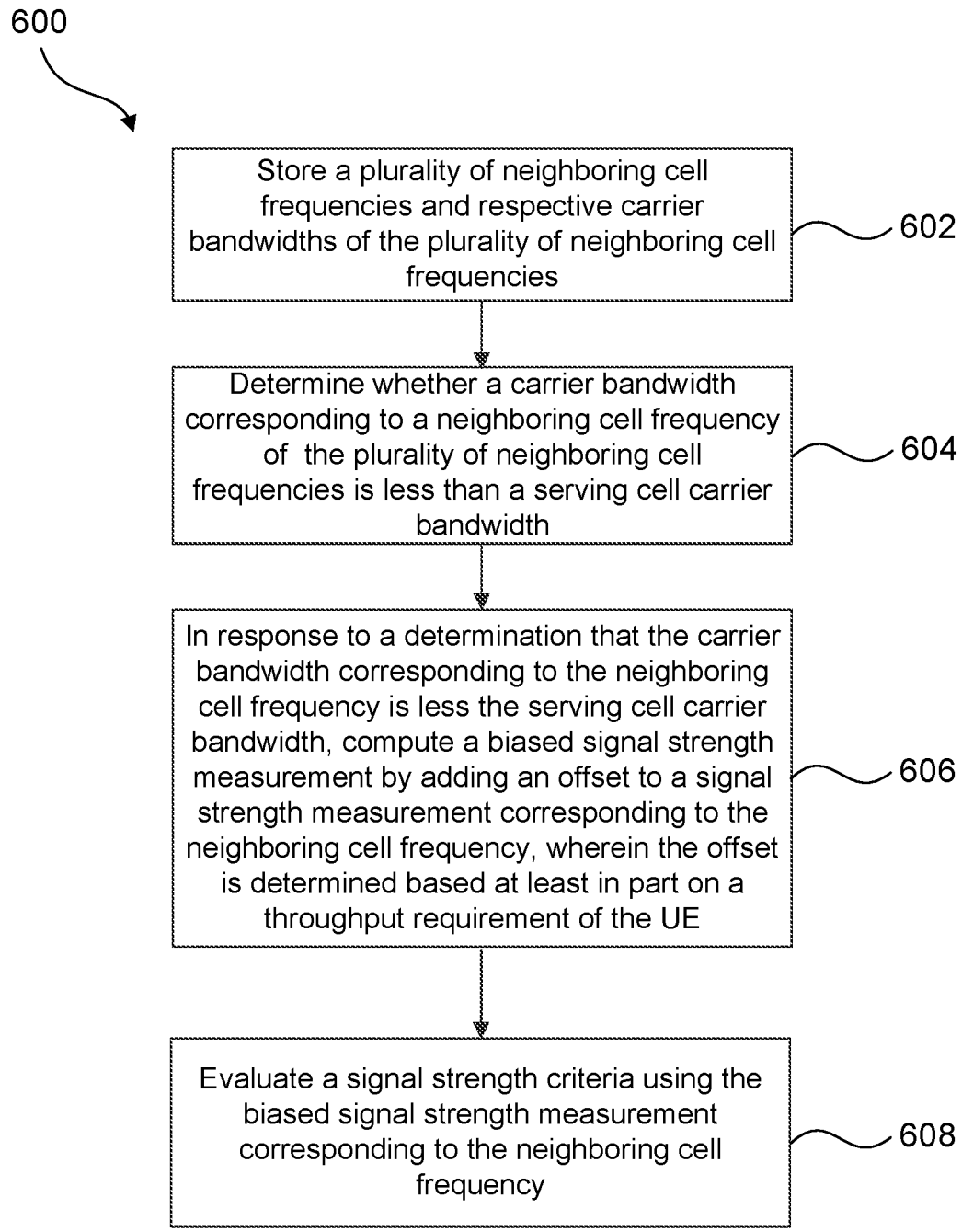
FIG. 6 illustrates an exemplary method performed by a UE implementing prioritized NR cell prioritization based on carrier bandwidth, according to some aspects of this disclosure.

FIG. 6 illustrates an exemplary method 600 performed by a UE implementing prioritized NR cell prioritization based on carrier bandwidth, according to some aspects of this disclosure. As a convenience and not a limitation, FIG. 6 may be described with regard to elements of FIGS. 1-5 and 7. Method 600 may also be performed by system 200 of FIG. 2 and/or computer system 700 of FIG. 7. But method 600 is not limited to the specific aspects depicted in those figures, and other systems may be used to perform the method as will be understood by those skilled in the art. It is to be appreciated that not all operations may be needed, and the operations may not be performed in the same order as shown in FIG. 6.

At 602, UE 102 stores a plurality of neighboring cell frequencies and respective carrier bandwidths of the plurality of neighboring cell frequencies. According to some aspects, UE 102 stores the system information it receives from NR base stations it has previously camped on over time in a stored list database 256. The stored list database 256 includes a list of carrier frequencies on which the UE has previously camped on and carrier bandwidth information corresponding to each carrier frequency in the list. The stored list database also includes information on cell selection, reselection, and handover parameters from previously received measurement control information elements.

At 604, UE 102 determines whether a carrier bandwidth corresponding to a neighboring cell frequency of the plurality of neighboring cell frequencies is less than a serving cell carrier bandwidth. According to some aspects, when UE 102 has a very low throughput requirement and the carrier bandwidth of the serving cell is greater than the bandwidth needed by UE 102, low-bandwidth neighboring cell frequencies from the list of frequencies are identified for consideration for cell selection, reselection, or handoff.

Alternatively, UE 102 determines whether a carrier bandwidth corresponding to a neighboring cell frequency of the plurality of neighboring cell frequencies is greater than a serving cell carrier bandwidth. According to some aspects, when UE 102 has a high throughput requirement and the carrier bandwidth of the serving cell is lower than the bandwidth needed by UE 102, high-bandwidth neighboring cell frequencies from the list of frequencies are identified for consideration for cell selection, reselection, or handoff.

At 606, in response to a determination that the carrier bandwidth corresponding to the neighboring cell frequency is less than the serving cell carrier bandwidth, UE 102 determines a biased signal strength measurement by adding an offset to a signal strength measurement corresponding to the neighboring cell frequency, wherein the offset is determined based at least in part on a data throughput requirement of the UE. According to some aspects, when the UE has a low data throughput requirement, the offset is configured to be a positive value. Alternatively, when the UE has a high data throughput requirement and the offset is configured to be a negative value.

Alternatively, at 606, in response to a determination that the carrier bandwidth corresponding to a neighboring cell frequency is greater than the serving cell carrier bandwidth, UE 102 determines a biased signal strength measurement by adding an offset to the signal strength measurement corresponding to the neighboring cell frequency, wherein the offset is determined based at least in part on the data throughput requirement of the UE. According to some aspects, when the UE has a low data throughput requirement, the offset is configured to be a negative value. Alternatively, when the UE has a high data throughput requirement, the offset is configured to be a positive value.

According to some aspects, the offset is determined based at least in part on a difference between the carrier bandwidth corresponding to the neighboring cell and the serving cell carrier bandwidth.

At 608, UE 102 evaluates signal strength criteria of the neighboring cell frequency using the biased signal strength measurement corresponding to the neighboring cell frequency. According to some aspects, the signal strength criteria is a cell reselection criteria of the neighboring cell frequency. According to some aspects, the signal strength criteria correspond to the trigger criteria for measurement events A3, A4, or A5.

Figure 7:
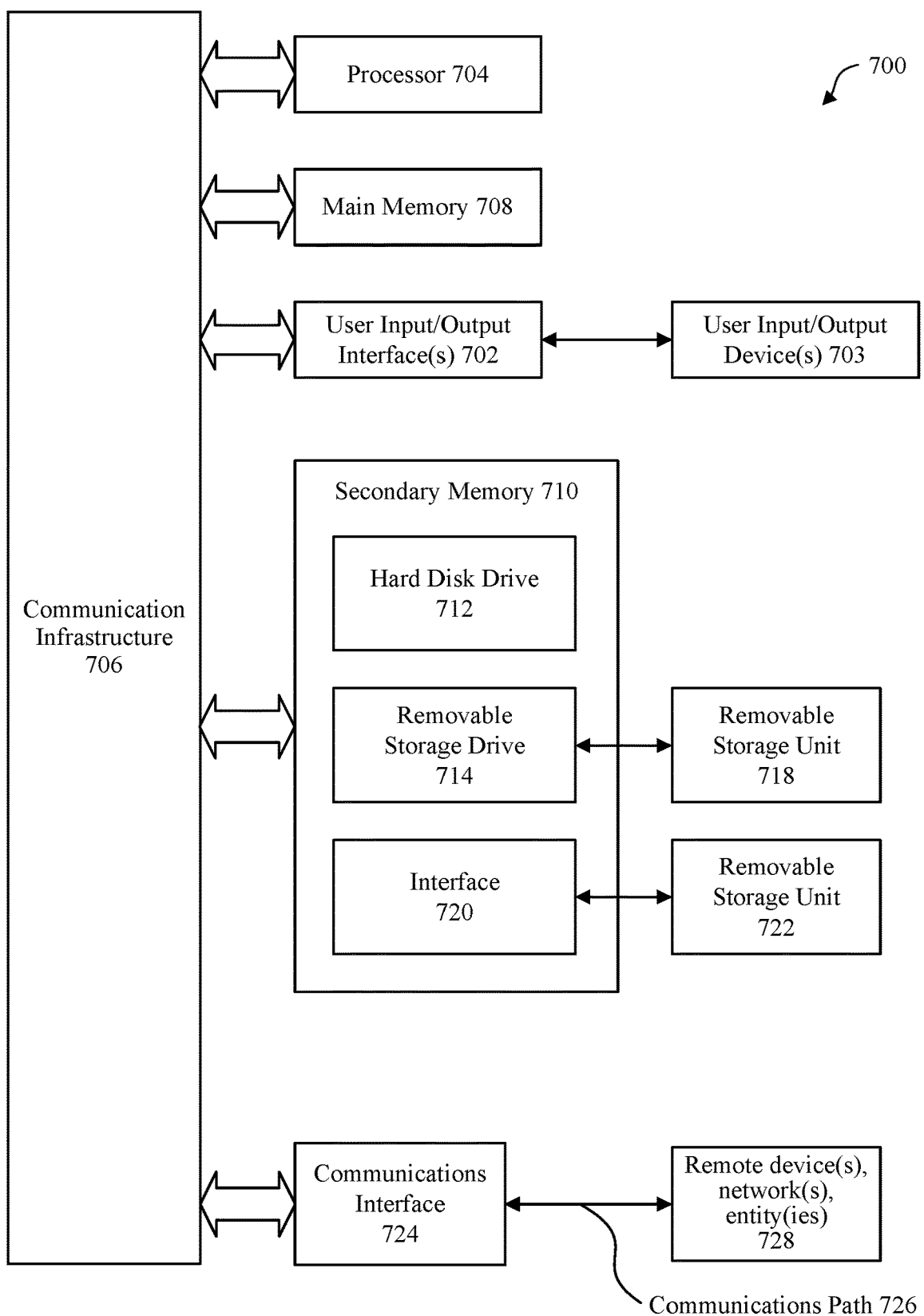
FIG. 7 is an example computer system for implementing some aspects or portion(s) thereof.

Various aspects can be implemented, for example, using one or more computer systems, such as computer system 700 shown in FIG. 7. Computer system 700 can be any well-known computer capable of performing the functions described herein such as UE 102 of FIG. 1. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. An apparatus, comprising:
a memory; and
a processor, coupled to the memory, and configured to:
store a plurality of neighboring cell frequencies and respective carrier bandwidths of the plurality of neighboring cell frequencies;
determine whether a carrier bandwidth corresponding to a neighboring cell frequency of the plurality of neighboring cell frequencies is less than a serving cell carrier bandwidth;
in response to a determination that the carrier bandwidth corresponding to the neighboring cell frequency is less than the serving cell carrier bandwidth, determine a biased signal strength measurement by adding an offset to a signal strength measurement corresponding to the neighboring cell frequency, wherein the offset is determined based at least in part on a data throughput requirement of a user equipment (UE); and
evaluate a signal strength criteria of the neighboring cell frequency using the biased signal strength measurement corresponding to the neighboring cell frequency.

2. The apparatus of claim 1, wherein the UE has a low data throughput requirement and the offset is configured to be a positive value.

3. The apparatus of claim 1, wherein the UE has a high data throughput requirement and the offset is configured to be a negative value.

4. The apparatus of claim 1, the processor is further configured to:
in response to a determination that the carrier bandwidth corresponding to a second neighboring cell frequency is greater than the serving cell carrier bandwidth, determine a second biased signal strength measurement by adding a second offset to the signal strength measurement corresponding to the second neighboring cell frequency, wherein the second offset is determined based at least in part on the data throughput requirement of the UE; and
evaluate the signal strength criteria of the second neighboring cell frequency using the second biased signal strength measurement corresponding to the second neighboring cell frequency.

5. The apparatus of claim 1, wherein the UE has a low data throughput requirement and the offset is configured to be a negative value.

6. The apparatus of claim 1, wherein the UE has a high data throughput requirement and the offset is configured to be a positive value.

7. The apparatus of claim 1, wherein the signal strength criteria is a cell reselection criteria of the neighboring cell frequency.

8. The apparatus of claim 1, wherein the signal strength criteria is an event A3, event A4, or event A5 criteria.

9. The apparatus of claim 1, wherein the offset is determined based at least in part on a difference between the carrier bandwidth corresponding to the neighboring cell and the serving cell carrier bandwidth.

10. A method of operating a user equipment (UE), comprising:
storing a plurality of neighboring cell frequencies and respective carrier bandwidths of the plurality of neighboring cell frequencies;
determining whether a carrier bandwidth corresponding to a neighboring cell frequency of the plurality of neighboring cell frequencies is less than a serving cell carrier bandwidth;
in response to a determination that the carrier bandwidth corresponding to the neighboring cell frequency is less the serving cell carrier bandwidth, determining a biased signal strength measurement by adding an offset to a signal strength measurement corresponding to the neighboring cell frequency, wherein the offset is determined based at least in part on a data throughput requirement of the UE; and
evaluating a signal strength criteria of the neighboring cell frequency using the biased signal strength measurement corresponding to the neighboring cell frequency.

11. The method of claim 10, wherein the UE has a low data throughput requirement and the offset is configured to be a positive value.

12. The method of claim 10, wherein the UE has a high data throughput requirement and the offset is configured to be a negative value.

13. The method of claim 10, further comprising:
in response to a determination that the carrier bandwidth corresponding to a second neighboring cell frequency is greater than the serving cell carrier bandwidth, computing a second biased signal strength measurement by adding a second offset to the signal strength measurement corresponding to the second neighboring cell frequency, wherein the second offset is determined based at least in part on the data throughput requirement of the UE; and
evaluating the signal strength criteria of the second neighboring cell frequency using the second biased signal strength measurement corresponding to the second neighboring cell frequency.

14. The method of claim 10, wherein the UE has a low data throughput requirement and the offset is configured to be a negative value.

15. The method of claim 10, wherein the UE has a high data throughput requirement and the offset is configured to be a positive value.

16. A non-transitory computer-readable medium (CRM) having instructions stored thereon that, when executed by a processor of a user equipment (UE), causes the UE to perform operations comprising:
storing a plurality of neighboring cell frequencies and respective carrier bandwidths of the plurality of neighboring cell frequencies;
determining whether a carrier bandwidth corresponding to a neighboring cell frequency of the plurality of neighboring cell frequencies is less than a serving cell carrier bandwidth;
in response to a determination that the carrier bandwidth corresponding to the neighboring cell frequency is less the serving cell carrier bandwidth, determining a biased signal strength measurement by adding an offset to a signal strength measurement corresponding to the neighboring cell frequency, wherein the offset is determined based at least in part on a data throughput requirement of the UE; and evaluating a signal strength criteria of the neighboring cell frequency using the biased signal strength measurement corresponding to the neighboring cell frequency.

17. The non-transitory CRM of claim 16, wherein the UE has a low data throughput requirement and the offset is configured to be a positive value.

18. The non-transitory CRM of claim 16, wherein the UE has a high data throughput requirement and the offset is configured to be a negative value.

19. The non-transitory CRM of claim 16, the operations further comprising:

in response to a determination that the carrier bandwidth corresponding to a second neighboring cell frequency is greater than the serving cell carrier bandwidth, determining a second biased signal strength measurement by adding a second offset to the signal strength measurement corresponding to the second neighboring cell frequency; and evaluating the signal strength criteria of the second neighboring cell frequency using the second biased signal strength measurement corresponding to the second neighboring cell frequency.

20. The non-transitory CRM of claim 19, wherein based on the UE having a low throughput requirement, the offset is configured to be a negative value; and wherein based on the UE having a high throughput requirement, the offset is configured to be a positive value.

* * * * *